United States Patent

[11] 3,622,102

[72] Inventor Calvin L. Fox
New York, N.Y.
[21] Appl. No. 865,622
[22] Filed Oct. 13, 1969
[45] Patented Nov. 23, 1971
[73] Assignee Scanfax Systems Corporation
New York, N.Y.

[54] COLOR-CODED CASSETTE
1 Claim, 6 Drawing Figs.

[52] U.S. Cl. .......... 242/199, 242/55.19 A, 206/52 F, 206/DIG. 29
[51] Int. Cl. .......... G03b 1/04, G11b 15/32, G11b 23/04
[50] Field of Search .......... 242/197–200, 55.19 A; 206/52 F, 59 F, DIG. 29

[56] References Cited

UNITED STATES PATENTS 3,291,409 12/1966 McClellan .......... 242/198 X
3,420,463 1/1969 Cousino .......... 242/55.19

*Primary Examiner*—Leonard D. Christian
*Attorney*—Amster & Rothstein

ABSTRACT: A magnetic tape recording system including means for color coding to insure proper orientation of a tape cassette during any of its functional placements in either or all of a recording, rewinding or erasing module of the system. At the commencement of most recording operations, the color coding of a cassette used in the system serves to insure the operator's knowledge that the tape is almost totally wound on the feeding spindle of the cassette rather than the takeup spindle. In the rewinding sequence, the color coding of the cassette serves to insure, in most rewinding operations, the operator's knowledge that the spindle upon which the magnetic tape is to be rewound is substantially empty at the commencement of the sequence. During the erasing operation, the color coding of the cassette insures that the operator has knowledge of the tape being totally wound on the bottom spindle in the vertically oriented erasing mechanism.

INVENTOR.
Calvin L. Fox
BY Amster & Rothstein
AMSTER & ROTHSTEIN
ATTORNEYS

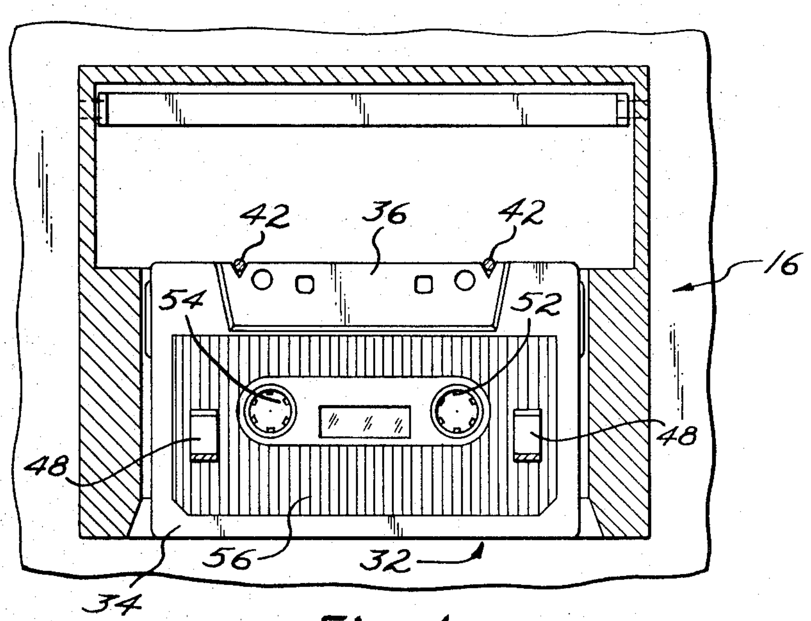
Fig. 4
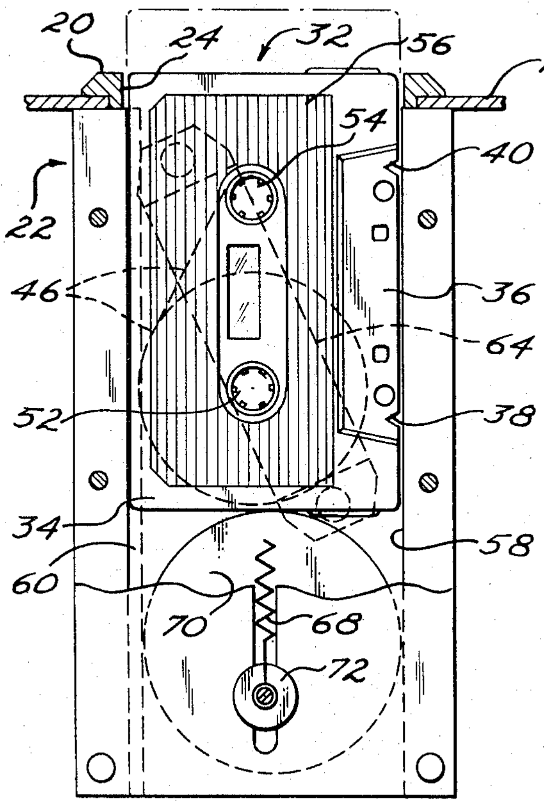
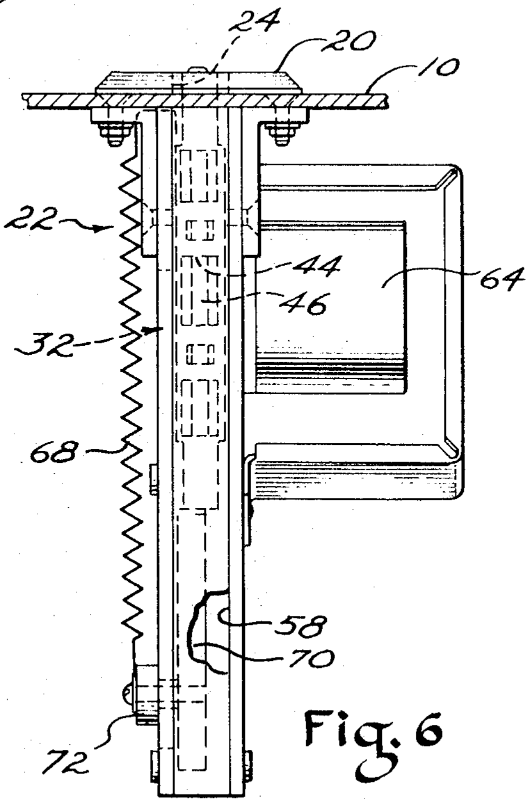
Fig. 6
Fig. 5
INVENTOR.
Calvin L. Fox
BY Amster & Rothstein
AMSTER & ROTHSTEIN
ATTORNEYS

COLOR-CODED CASSETTE

COLOR-CODED CASSETTE

This invention relates primarily to magnetic tape recording and more particularly to means for use in a magnetic tape recording system which insures proper orientation of a tape cassette in the various function stations of that system.

The present invention is particularly useful with an apparatus and method for the preparation of and the transmission of audio information from an origin location to a first remote location (normally a library or other convenient depository) and then, in multiple copies of such audio information, the dissemination thereof to a plurality of further remote locations. To more particularly describe this method of information flow, the contemplated origin location is a recording studio having the necessary recording equipment for reproducing audio information on tapes. The audio information which is recorded may be in the form of a lecturer reading from a written manuscript. Following the recording of individual master tapes at the recording studio, the tapes are packaged in protective cassettes and placed in a convenient depository (such as a library). To reproduce the master, a recording system capable of accommodating at least one, and preferably more, so-called "slave" tapes in cassettes is provided for recording the program of a selected master tape. This enables wide dissemination of audio information on the master tapes. The "slave" recordings are produced in cassettes and may then be reproduced or played back at further remote locations. It is contemplated that a further step of the method involves the repeated use of the "slave" tapes to record other master tape programs thereon; or in the alternative, for the slaves to become themselves master tape recordings.

The color coding as described herein is particularly useful with a recording system for producing multiple "slave" tape recordings from a master at the library location. Three of the major functions of the tape recording system useable at such a location are recording, erasing and rewinding, the first of which in most instances requires that the tape be almost totally wound about the feeding spindle, the second of which requires that the tape be almost totally wound about the lower spindle in order to receive the greatest exposure to the vertically oriented degaussing means and the third of which requires that the tape be almost totally wound about the spindle other than the one upon which the tape will be rewound.

Accordingly, a primary object of the present invention is to provide an efficient and reliable means by which the location of the tape and the orientation of the cassette may be insured.

A further and more particular object is to provide a coding system for insuring such location and orientation.

These and other objects are accomplished in accordance with one illustrative embodiment of the present invention by a magnetic tape cassette, a panel of which is produced of a material colored differently than the rest of the cassette or in the alternative by a cassette panel painted or otherwise colored differently than the rest of the cassette. The color coded panel is oriented in the various functions of a tape recording system so that it is always visible to the operator; that is, when the orientation of the cassette is horizontal in a particular function, the color coded panel is facing upwardly and when the cassette is in a vertical orientation during a particular function of the tape recording system, the color coded panel is facing forwardly of the system console and therefore towards the operator.

The above brief description, as well as further objects, features and advantages of the present invention will be more fully appreciated by reference to the following detailed description of the preferred, but nonetheless illustrative embodiment when taken in conjunction with the accompanying drawings, wherein;

FIG. 4 is a top sectional view taken along the line 4—4 of FIG. 3 and showing the cassette and its orientation in a cassette holder;

FIG. 5 is a front sectional view taken along the line 5—5 of FIG. 1 and showing a cassette and its orientation during the erase function of a magnetic tape recording system and further showing the erase mechanism thereof; and, FIG. 6 is a side sectional view taken along the line 6—6 of FIG. 5 and showing further details of the erase mechanism of the magnetic tape recording system.

Figures 1, 2:
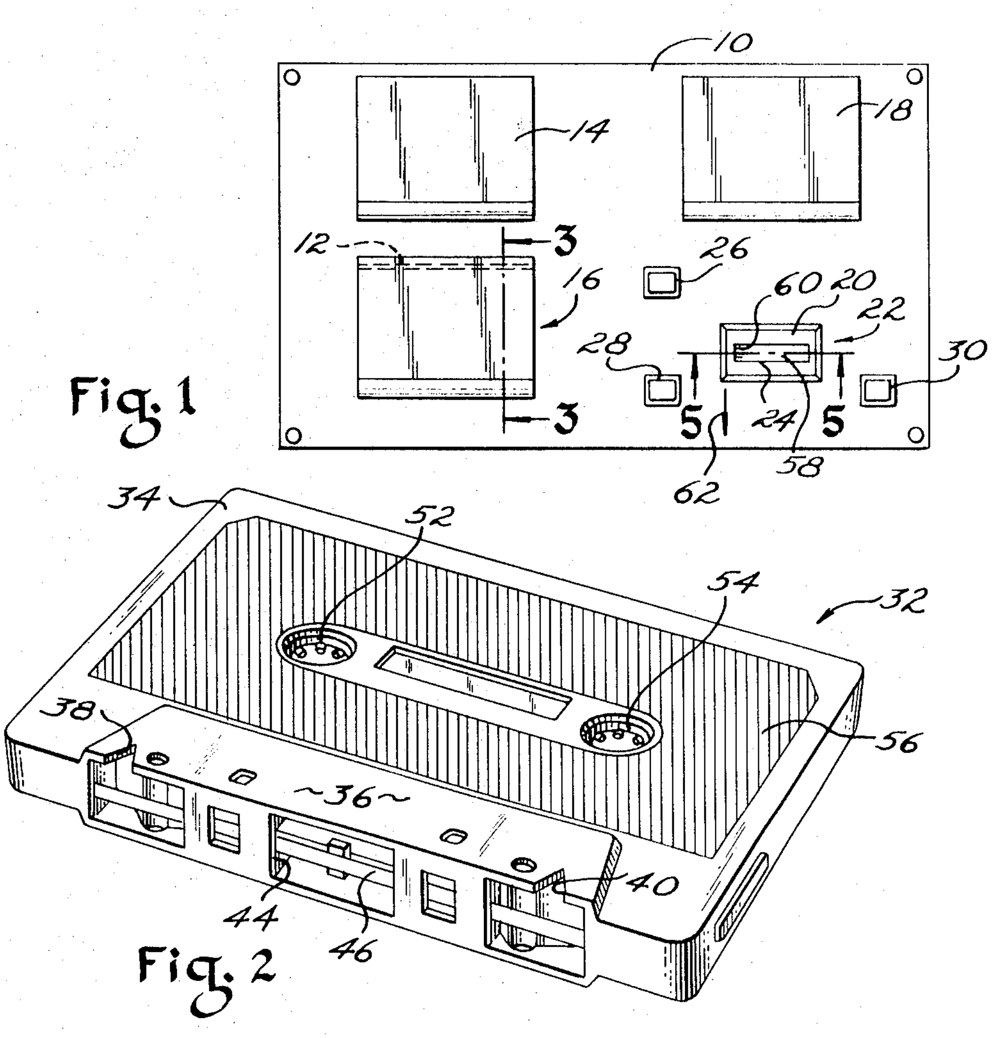
FIG. 1 is a top view of the operating panel of a magnetic tape recording system in which the present invention is useful.
FIG. 2 is a perspective view of a color-coded cassette according to the present invention.

Referring specifically to the drawings, the tape recording system panel is shown in FIG. 1 as comprising a panel surface 10 having mounted thereon, by mounting means 12' or the like, cassette holders 14, 16, 18. For purposes of the present description, it will be assumed that cassette holder 14 is for holding a master tape cassette during a recording operation and cassette holder 16 is for holding a "slave" cassette during a recording operation. Also, it will be assumed that cassette holder 18 is for holding a tape cassette for rewinding after recording. Also shown on the panel 10 of FIG. 1 is the top wall 20 of an erase mechanism housing, generally designated 22. The top wall 20 defines a slot 24 for receiving a tape cassette to begin the erase operation. Actuator buttons 26, 28, 30 are for commencing various of the operations of the tape recording system, the button 28 energizing the power for recording, the button 30 energizing the power source for the entire system and the button 26 for operating indicator lights or the like for showing that a rewind operation is in progress.

For the purposes of the present description, the loading mechanism and apparatus for inserting a "slave" cassette in the record cassette holder 16 will now be discussed with reference to FIGS. 2 through 4. The cassette (FIGS. 2 and 3), designated generally by the reference numeral 32, is shown to include a top panel 34 having a guide extension 36 (and enlargement) to assist its entry into the erase mechanism slot 24 (the operation of which will be described in a later part of this specification). The guide extension 36 includes a pair of notches 38, 40 for locating the cassette properly within the cassette holder 16, by means of insertion of locating pins 42 of the cassette holder in the notches 38, 40. The cassette 32 further includes a window 44 for enabling access of the recording head to the tape 46. Further locating and guiding means in the form of a spring 48 is attached to the internal upper surface of the cassette holder 16 by means of attachment screws 50 or the like. The tape cassette 32 is also shown as including a pair of tape spindles 52, 54 upon which the tape 46 is wound at various stations of the tape recording system.

Figure 3:
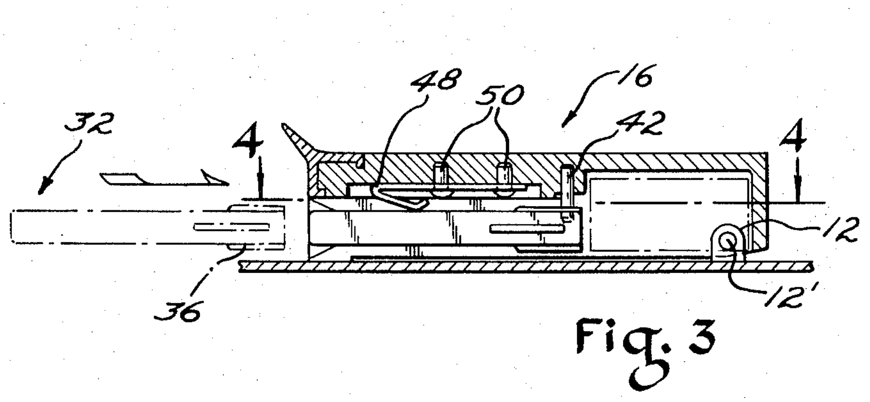
FIG. 3 is a side, sectional view taken along line 3—3 of FIG. 1 and showing a cassette and its orientation relative to a cassette holder of the panel of FIG. 1.

The cassette holder 16 is shown in its proper orientation for receipt of the cassette 32 is FIG. 3 and in that figure it is clearly seen that attachment means 12 is provided for the cassette holder and includes a shaft 12' about which the cassette 16 is rotatable in order to provide an entry facility for the tape cassette 32. That is, when it is desired to insert the tape cassette 32, the cassette holder 16 is lifted about shaft 20' and the tape cassette 32 inserted so that notches 38, 40 are properly located with respect to the locating pins 42. The cassette 32 is shown in its inserted position in the cassette holder 16 in FIG. 4. The recording function of the tape recording system may then commence. In order to insure that the tape 46, to be recorded with information from the master tape on the cassette within tape cassette holder 14, is on spindle 52 (the feeding spindle) and that the takeup spindle 54 is empty, a means in addition to the guide extension 36 is necessary. The guide extension 36 will always be placed by the operator as the leading edge of the cassette to enter the cassette holder 16 but within these limits it is possible for the operator to have the cassette 32 upside-down thereby reversing the spindles 52, 54 from the proper orientation just noted. According to the present invention, a color-coded panel 56 (FIGS. 2 and 4) is provided on the surface of the cassette 32 which is to be upwardly facing during insertion to the recording cassette holder 16. In this way, a total assurance of proper orientation is provided. The color-coded panel 56 may be either molded from a colored material (such as plastic) or painted or in other ways colored after manufacture, the color being different from the rest of the cassette's exposed surfaces.

Further use of the color coding according to the present invention is demonstrated by reference to FIGS. 5 and 6 wherein an erase mechanism 22 is shown with the cassette inserted for performance of the erase function after recording and rewinding. Briefly describing the erase mechanism, it is shown as including a receptacle forming housing 22 defining a receptacle 58 for receiving the cassette 32 through slot 24. The receptacle 58 includes a guide track 60 along one side thereof to accept, upon application of an insertion force, insertion of the cassette into the slot 24 in one orientation and to prevent insertion in another orientation. To explain this orientation insuring structure, referring back to FIG. 1, the slot 24 and receptacle 58 is shown with guide track 60 along one side of the receptacle for blocking insertion of the cassette 32 with the guide extension 36 on the side of the receptacle 58 having the guide track 60. The enlarged guide extension 36 must be placed so that it is nearest to the side of the receptacle 58 opposite to the guide track 60. Within such limits, the cassette 32 could be inserted with the wrong end up for the erase function of the tape recording system. In order to prevent such insertion, the color-coded panel 56 is provided such that the tape is properly inserted only with the color-coded panel 56 facing towards the operator or in the direction of the arrow 62 shown in FIG. 1. Such orientation preserving devices such as the guide track 60 and the color-coded panel 56 are necessitated by the erase mechanism shown in FIGS. 5 and 6 which, as will hereinafter be described, requires that the spindle 54 be empty and the spindle 52 have the recorded tape would thereon.

Further describing the mechanism for erasing the tape in tape cassette 32, a degaussing coil 64 is mounted adjacent to the receptacle 58 for creating an electromagnetic field, the degaussing coil being positioned along the receptacle adjacent to the end having slot 24 in order to insure a double pass of the tape through the field. If the tape 46 is wound on the upper spindle 54, such double pass, once upon travel downward into the receptacle 58 by cassette 32 and once upon return of the cassette upward in the receptacle 58, would be precluded. A return mechanism is provided to insure a quick return of the cassette 32 to the operator, the mechanism including a guideway 66, a spring 68, tape support means in the form of disc 70 and connecting means 72 for connecting the spring at one of its ends to the tape support means, the spring being connected at its other end to the receptacle-forming housing defining the slot 24. An insertion force depresses the tape support means 70 to a point where it allows a full pass of the tape 46 through the degaussing field and a release of the insertion force allows the spring 68 to propel the cassette upward to return it to the operator thereby providing a second pass of the tape 46 through the degaussing field.

In accordance with the above description a tape cassette for use in a tape recording system is provided with a color-coded panel 56 to insure proper orientation of the tape cassette during the various sequences of operations. In this way efficient and reliable recording and erasure of magnetic tapes is enabled. It is assumed, of course, that the same orientation rules apply to insertion of the tape cassette 32 to the rewind cassette holder 18 as applied to its insertion in the recording cassette holder 16.

What is claimed is:

1. A magnetic tape recording system including apparatus for insuring proper orientation of a tape cassette during any of its functional placements comprising a recording module, an erase module, a rewind module and a cassette, said cassette having first orientation insuring means, a pair of tape spindles, a plurality of edge panels and a top panel, said top panel having an exposed, color-coded surface adapted in cooperation with said first orientation insuring means and said modules to insure said proper orientation, said surface being oriented with respect to said recording, erase and rewind modules such that it is visible immediately prior to insertion to said modules, said first orientation insuring means being an enlarged guide extension protruding from said top panel.

* * * * *